(No Model.)

E. E. ANGELL.
JOURNAL BOX

No. 486,175. Patented Nov. 15, 1892.

WITNESSES
Harry King

INVENTOR:
Edwin E. Angell,
By F. C. Somes, Attorney.

UNITED STATES PATENT OFFICE.

EDWIN E. ANGELL, OF SOMERVILLE, MASSACHUSETTS, ASSIGNOR TO THE ELECTRICAL FORGING COMPANY, OF MAINE.

JOURNAL-BOX.

SPECIFICATION forming part of Letters Patent No. 486,175, dated November 15, 1892.

Application filed July 16, 1891. Serial No. 399,754. (No model.)

*To all whom it may concern:*

Be it known that I, EDWIN E. ANGELL, a citizen of the United States of America, residing at Somerville, in the county of Middlesex and State of Massachusetts, have invented certain new and useful Improvements in Journal-Boxes, of which the following is a specification.

This invention relates to journal-boxes for shafting, and is especially designed for the armature-shafts of electric motors and dynamos.

The objects of the invention are to secure accuracy and facility of adjustment of the sleeve, a thorough lubrication thereof, and simplicity and economy of construction.

Figure 1:
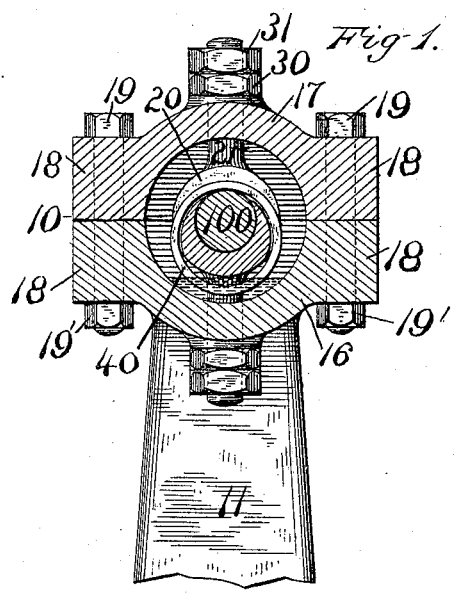
Figure 2:
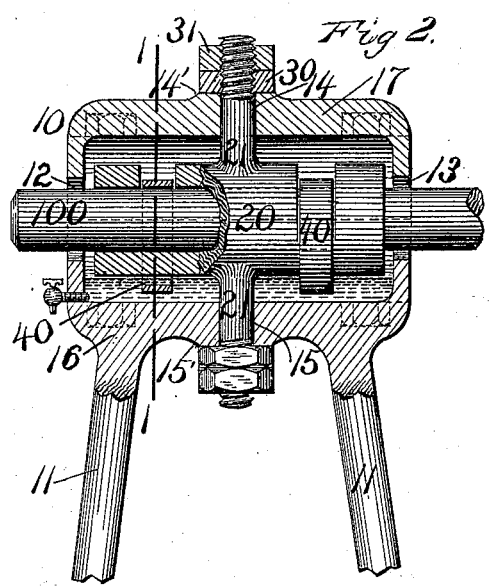
Figure 3:
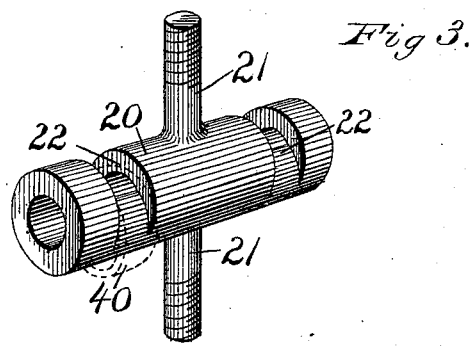

Figure 1 of the accompanying drawings represents an end elevation of this improved journal-box supported on a pedestal-bracket. Fig. 2 represents a longitudinal vertical section thereof. Fig. 3 represents a perspective view of the sleeve of this improved journal-box.

Similar numerals of reference indicate corresponding parts in the different figures.

The casing 10 is provided with supports 11, which may be in the form of pedestal, wall, or dependent brackets. This casing has an opening 12 at one end, through which the shaft 100 passes, and also an opening 13 at the opposite end when the shaft extends through the casing. The casing is also provided with lateral holes 14 and 15, preferably at diametrically-opposite points and preferably disposed in a vertical plane. These holes are surrounded by annular bosses 14' and 15', respectively.

In the form shown in the drawings the casing is constructed in two sections, a lower section or pillow-block 16 and an upper section or cap 17. These sections are provided with perforated ears 18 and clamping-bolts 19, having nuts 19', which pass through said ears and constitute a fastening device for clamping the sections together.

A sleeve 20 is disposed in the casing 10 and is provided with radial arms or trunnions 21. These radial arms are disposed at points opposite the holes 14 and 15 of the casing 10 and extend through said holes. They are screw-threaded at their outer ends, and nuts 30 are screwed thereon down against the casing 10 or bosses thereon. Check-nuts 31 are also disposed on said arms over the nuts 30. The sleeve 20 is provided with transverse slots 22 in its upper portion, which serve to receive and guide lubricating-rings 40. These rings are larger in diameter than the sleeve, and the upper portions thereof rest on the shaft 100, and their lower portions dip into the oil in the casing 10 below said shaft.

In the use of this improved journal-box the shaft 100 is passed through the sleeve 20, and said sleeve is adjusted at the proper height in the casing 10 by means of the nuts 30 and 31. The sleeve is adapted to swivel on its trunnions to bring it in alignment with other bearings and with the shaft. The rotation of the shaft causes the lubricating-rings to move around its axis and carry oil from the lower section of the casing 10 to the upper surface of the shaft, whence it is distributed along the sleeve. If the shaft becomes deflected out of alignment from sagging of beams or other cause, its alignment may be readily readjusted by means of the nuts and trunnions. The slots 22 being open at the tip of the sleeve, there is no tendency to bind the lubricating-rings.

I claim as my invention—

In a journal-box, the combination of a casing for containing oil, a sleeve disposed therein and provided with slots and with trunnions extending through the sides of said casing, fastening devices on said trunnions, and rings disposed in said slots and dipping into the oil-chamber of said casing.

EDWIN E. ANGELL.

Witnesses:
GEO. D. BURTON,
W. S. COGSWELL.